(12) United States Patent
Kodate et al.

(10) Patent No.: US 8,716,411 B2
(45) Date of Patent: May 6, 2014

(54) PROCESS FOR PRODUCTION OF ORGANOPOLYSILOXANE COMPOUND

(75) Inventors: Takashi Kodate, Wakayama (JP);
Katsuhiko Rindo, Wakayama (JP);
Osamu Takiguchi, Tokyo (JP)

(73) Assignee: Kao Corporation, Tokyo (JP)

( * ) Notice: Subject to any disclaimer, the term of this patent is extended or adjusted under 35 U.S.C. 154(b) by 0 days.

(21) Appl. No.: 13/516,081

(22) PCT Filed: Dec. 14, 2010

(86) PCT No.: PCT/JP2010/072500
§ 371 (c)(1),
(2), (4) Date: Jun. 14, 2012

(87) PCT Pub. No.: WO2011/074584
PCT Pub. Date: Jun. 23, 2011

(65) Prior Publication Data
US 2012/0302705 A1    Nov. 29, 2012

(30) Foreign Application Priority Data

Dec. 16, 2009 (JP) ................................. 2009-285638

(51) Int. Cl.
*C08F 283/12* (2006.01)
*C08G 77/388* (2006.01)

(52) U.S. Cl.
USPC ....................................................... 525/474

(58) Field of Classification Search
USPC ....................................................... 525/474
See application file for complete search history.

(56) References Cited

U.S. PATENT DOCUMENTS

| 5,171,821 | A | * | 12/1992 | Nozawa et al. ............... 528/125 |
| 5,472,689 | A | * | 12/1995 | Ito ............................ 424/70.122 |
| 6,027,718 | A | | 2/2000 | Takiguchi et al. |
| 6,440,429 | B1 | * | 8/2002 | Torizuka et al. ............... 424/401 |
| 6,610,278 | B2 | * | 8/2003 | Kashimoto ...................... 424/64 |
| 7,001,864 | B2 | * | 2/2006 | Kiso et al. ..................... 502/155 |
| 2006/0045862 | A1 | * | 3/2006 | Tada et al. ............... 424/70.122 |
| 2010/0203002 | A1 | | 8/2010 | Fukuhara et al. |
| 2012/0296052 | A1 | * | 11/2012 | Kodate et al. .................. 525/474 |
| 2013/0030138 | A1 | * | 1/2013 | Kodate ........................... 528/28 |

FOREIGN PATENT DOCUMENTS

| JP | 2 276824 | 11/1990 |
| JP | 4 85335 | 3/1992 |
| JP | 10 306163 | 11/1998 |
| JP | 2009 24114 | 2/2009 |
| JP | 2009 149597 | 7/2009 |
| JP | 2009 256367 | 11/2009 |
| WO | 2009 014237 | 1/2009 |

OTHER PUBLICATIONS

U.S. Appl. No. 13/515,966, filed Jun. 14, 2012, Kodate, et al.
International Search Report Issued Mar. 8, 2011 in PCT/JP10/72500 Filed Dec. 14, 2010.

\* cited by examiner

*Primary Examiner* — Mike M Dollinger
(74) *Attorney, Agent, or Firm* — Oblon, Spivak, McClelland, Maier & Neustadt, L.L.P.

(57) ABSTRACT

A method of producing an organopolysiloxane compound in which a poly(N-acylalkyleneimine) segment comprising repeating units represented by formula (1):

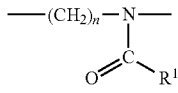

wherein $R^1$ is a hydrogen atom, an alkyl group having 1 to 22 carbon atoms, an aralkyl group, or an aryl group, and n is 2 or 3, is bonded to a terminal end and/or a side chain of an organopolysiloxane segment, the method comprising:

a step (a) of subjecting a cyclic imino ether compound represented by formula (I):

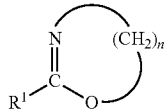

wherein $R^1$ is a hydrogen atom, an alkyl group having 1 to 22 carbon atoms, an aralkyl group, or an aryl group, and n is 2 or 3, to ring opening polymerization in a solvent, thereby preparing a terminal reactive poly(N-acylalkyleneimine) solution;

a step (b) of mixing a modified organopolysiloxane having an amino group at a terminal end and/or a side chain of its molecular chain and a solvent, thereby preparing a modified organopolysiloxane solution;

a step (c) of mixing the terminal reactive poly(N-acylalkyleneimine) solution obtained in step (a) and the modified organopolysiloxane solution obtained in step (b), thereby allowing 65 to 95 mol % of total amino groups in the modified organopolysiloxane to react with the terminal reactive poly(N-acylalkyleneimine); and a step (d) of removing the solvent at 100 to 200° C. after completing step (c).

18 Claims, 2 Drawing Sheets

PROCESS FOR PRODUCTION OF ORGANOPOLYSILOXANE COMPOUND

TECHNICAL FIELD

The present invention relates to a method of producing organopolysiloxane compounds.

BACKGROUND ART

Organopolysiloxane compounds (hereinafter also referred to as "silicone compounds") have various characteristics, such as low surface tension, good lubricating properties and mold releasability, high heat stability, glass transition point generally extremely low, and good gas permeability. With these characteristics, various forms of silicone compounds have been used in an extremely wide range of applications, for example, as lubricants, heat media, electrical insulators, leveling agents for paints, mold release agents, cosmetic additives, fiber treating agents, shock absorbers, sealing materials, templating agents, glazing agents, foam stabilizers, and defoaming agents.

Also in the field of personal care, silicone compounds have been widely used, for example, to improve the texture of cosmetics, such as skin care products, foundations, shampoos, and conditioners. Silicone compounds have been also used as a base material of hair setting agents. Many customers desire personal care products having good texture with little sticky nature in a solid state. In addition, silicone compounds are required to be soluble in ethanol in view of easiness of blending. For example, Patent Document 1 discloses a silicone compound which is soluble or dispersible in various solvents, such as ethanol.

Known methods of producing silicone elastomers, as described in, for example, Patent Document 2, include two steps, a step of polymerizing poly(N-acylalkyleneimine) oligomer and a step of grafting the oligomer to a silicone compound. The reactions of these steps are required to carry out in homogeneous system, and therefore, generally conducted in a solvent. The solvent usable in these steps are limited to an aprotic solvent, such as ethyl acetate and chloroform.

If the silicone compound obtained by such methods is applied to personal care products, a step for removing the solvent is required after completing the reaction. Since the solvent odor is not favored in personal care application, the residual solvent should be removed as much as possible. This requires the removal of solvent at high temperatures under reduced pressure.

Although the silicone compound disclosed in Patent Document 1 is more soluble in various solvent than ever known products, silicone compounds having good qualities cannot be stably produced in some cases. If the removal of solvent is carried out at high temperatures, in particular, the molecular weight of the silicone compound may reduce to deteriorate its texture. In contrast, many base materials for cosmetics are required to have good texture with little sticky nature in a solid state.

PRIOR ART DOCUMENT

Patent Documents

Patent Document 1: JP 2-276824A
Patent Document 2: JP 4-85335A

SUMMARY OF THE INVENTION

Problems to be Solved by the Invention

An object of the present invention is to provide a method of producing organopolysiloxane compounds having good texture with little sticky nature in stable quality while preventing the molecular weight from being reduced.

Means for Solving the Problems

Namely, the present invention provides a method of producing an organopolysiloxane compound in which a poly(N-acylalkyleneimine) segment comprising repeating units represented by formula (1):

(1)

wherein $R^1$ is a hydrogen atom, an alkyl group having 1 to 22 carbon atoms, an aralkyl group, or an aryl group, and n is 2 or 3,
is bonded to a terminal end and/or a side chain of an organopolysiloxane segment,
the method comprising:
a step (a) of subjecting a cyclic imino ether compound represented by formula (I);

(I)

wherein $R^1$ and n are the same as those defined above with respect to $R^1$ and n of formula (1),
to ring opening polymerization in a solvent, thereby preparing a terminal reactive poly(N-acylalkyleneimine) solution;
a step (b) of mixing a modified organopolysiloxane having an amino group at a terminal end and/or a side chain of its molecular chain and a solvent, thereby preparing a modified organopolysiloxane solution;
a step (c) of mixing the terminal reactive poly(N-acylalkyleneimine) solution obtained in step (a) and the modified organopolysiloxane solution obtained in step (b), thereby allowing 65 to 95 mol % of total amino groups in the modified organopolysiloxane to react with the terminal reactive poly(N-acylalkyleneimine); and
a step (d) of removing the solvent at 100 to 200° C. after completing step (c).

Effect of the Invention

According to the method of the invention, the reduction in the molecular weight is prevented and organopolysiloxane compounds having good texture with little sticky nature can be produced in stable quality.

MODE FOR CARRYING OUT THE INVENTION

Organopolysiloxane Compound

Figure 1:
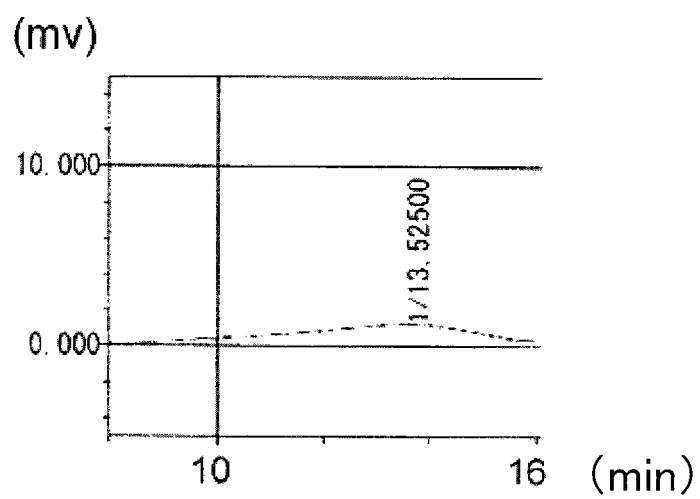
FIG. 1 is a GPC chart of the sample in Example 1 before heat-drying.

In the organopolysiloxane compound produced by the method of the invention, a poly(N-acylalkyleneimine) segment comprising the repeating units represented by formula (1) is bonded to a terminal end and/or a side chain of the organopolysiloxane segment.

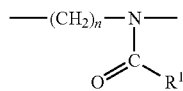
(1)

In formula (1), $R^1$ is a hydrogen atom, an alkyl group having 1 to 22 carbon atoms, an aralkyl group, or an aryl group, and n is 2 or 3.

An organopolysiloxane compound which comprises the modified organopolysiloxane segment represented by the following formula (2) and the poly(N-acylalkyleneimine) segment comprising the repeating units represented by formula (1) is preferred, although not particularly limited thereto.

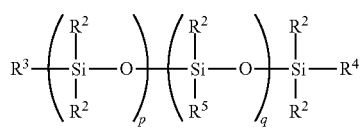
(2)

In the above formula, each of $R^2$ is independently an alkyl group having 1 to 22 carbon atoms or a phenyl group; each of $R^3$ and $R^4$ is independently an alkyl group having 1 to 22 carbon atoms, a phenyl group, or a bivalent linker represented by any of the following formulae (i) to (vi), $R^5$ is a bivalent linker represented by any of the following formulae (i) to (vi), p is an integer of 2 to 4000, and q is an integer of 2 to 250.

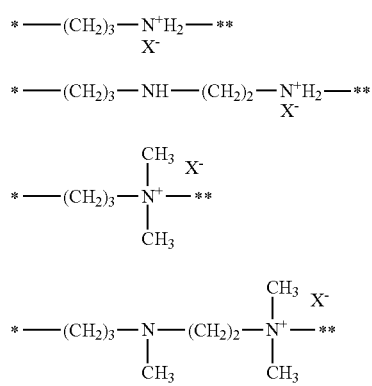

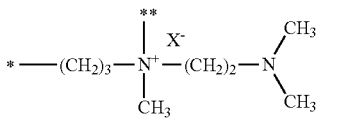
(v)

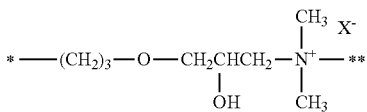
(vi)

In formulae (i) to (vi), * is a site to be bonded to the silicon atom of formula (2), ** is a site to be bonded to the poly(N-acylalkyleneimine) segment comprising the repeating units represented by formula (1), and $X^-$ is a counter ion of the quaternary ammonium salt.

The alkyl group having 1 to 22 carbon atoms for $R^1$ in formula (1) is preferably a linear, branched, or cyclic alkyl group having 1 to 22 carbon atoms, more preferably an alkyl group having 1 to 10 carbon atoms, and still more preferably an alkyl group having 1 to 6 carbon atoms. Specific examples thereof include methyl group, ethyl group, n-propyl group, isopropyl group, n-butyl group, tert-butyl group, pentyl group, hexyl group, cyclohexyl group, heptyl group, octyl group, nonyl group, decyl group, undecyl group, dodecyl group, octadecyl group, nonadecyl group, eicosyl group, and docosyl group.

The aralkyl group for $R^1$ is preferably an aralkyl group having 7 to 15 carbon atoms, more preferably an aralkyl group having 7 to 14 carbon atoms, and still more preferably an aralkyl group having 7 to 10 carbon atoms. Specific examples thereof include benzyl group, phenethyl group, trityl group, naphthylmethyl group, and anthracenylmethyl group.

The aryl group for $R^1$ is preferably an aryl group having 6 to 14 carbon atoms, more preferably an aryl group having 6 to 12 carbon atoms, and still more preferably an aryl group having 6 to 9 carbon atoms. Specific examples thereof include phenyl group, tolyl group, xylyl group, naphthyl group, biphenyl group, anthryl group, and phenanthryl group.

Of the above, $R^1$ is preferably a linear or branched alkyl group having 1 to 6 carbon atoms, more preferably a linear or branched alkyl group having 1 to 3 carbon atoms, and particularly preferably ethyl group.

In formula (1), n is preferably 2.

The alkyl group having 1 to 22 carbon atoms for $R^2$ to $R^4$ in formula (2) and preferred examples thereof are the same as those defined above with respect to the alkyl group having 1 to 22 carbon atoms for $R^1$.

$R^2$ is preferably a linear or branched alkyl group having 1 to 6 carbon atoms, more preferably a linear or branched alkyl group having 1 to 3 carbon atoms, and particularly preferably methyl group. Also, the alkyl group having 1 to 22 carbon atoms for each of $R^3$ and $R^4$ is preferably a linear or branched alkyl group having 1 to 6 carbon atoms, more preferably a linear or branched alkyl group having 1 to 3 carbon atoms, and particularly preferably methyl group.

The bivalent linker for $R^3$ to $R^5$ of formula (2) represented by any of formulae (i) to (vi) is a nitrogen-containing alkylene group and acts as a linker for connecting the modified organopolysiloxane segment and the poly(N-acylalkyleneimine) segment. Of the above linkers represented by formulae (i) to (vi), preferred are those represented by formula (i) or (ii).

In formulae (i) to (vi), $X^-$ is a counter ion of the ammonium. Examples thereof include ethylsulfate ion, methylsulfate ion, chloride ion, iodide ion, sulfate ion, p-toluenesulfonate ion, and perchlorate ion.

In formula (2), p is an integer of 2 to 4000, preferably an integer of 135 to 1600, more preferably an integer of 400 to 1350, and still more preferably an integer of 400 to 1000, and q is an integer of 2 to 150, preferably an integer of 3 to 50, more preferably an integer of 5 to 30, more preferably an integer of 10 to 25, and still more preferably an integer of 15 to 25.

The connecting ratio of the organopolysiloxane segment referred to herein means a ratio of the amino group to which the poly(N-acylalkyleneimine) segment is connected to the total amino groups in the modified organopolysiloxane segment. The connecting ratio of the organopolysiloxane segment is calculated from formula (1):

Connecting ratio (%)=(1−content of non-reacted amino groups (mol/g)/total content of amino groups in modified organopolysiloxane segment (mol/g))×100  (1)

wherein the content of the non-reacted amino groups is measured by a neutralizing titration of the organopolysiloxane compound.

In view of the heat stability of the organopolysiloxane compound, the connecting ratio of the organopolysiloxane segment is 65 to 95%, preferably 70 to 90%, and more preferably 75 to 88%.

The molecular weight (MWox) of the poly(N-acylalkyleneimine) segment in the organopolysiloxane compound can be determined by the calculation from the molecular weight and the degree of polymerization of the N-acylalkyleneimine units or gel permeation chromatography (GPC). In the present invention, the molecular weight is expressed by a number average molecular weight measured by GPC. In view of the texture of cosmetics containing the organopolysiloxane compound and its solubility in ethanol, MWox is preferably 150 to 50,000, more preferably 500 to 10,000, still more preferably 800 to 5000, and particularly preferably 1000 to 3000. The weight average molecular weight of the poly(N-acylalkyleneimine) segment measured by GPC is preferably 180 to 65,000, more preferably 600 to 13,000, still more preferably 960 to 6,500, further preferably 1,200 to 3,900, and particularly preferably 1,200 to 2,000.

The detail of the measuring conditions of GPC is described in the example portion.

The weight average molecular weight (MWsi) of the organopolysiloxane segment constituting the main chain of the organopolysiloxane compound is preferably 300 to 300,000. In view of the solubility in ethanol, MWsi is more preferably 10,000 to 120,000 and still more preferably 30,000 to 100,000. Since MWsi has the skeleton common to the starting modified organopolysiloxane, MWsi is nearly the same as the weight average molecular weight of the modified organopolysiloxane. The weight average molecular weight of the modified organopolysiloxane is determined by GPC after acetylating the active hydrogen atoms with acetic anhydride.

In view of the texture of cosmetics containing the organopolysiloxane compound and its solubility in ethanol, the ratio of the mass (Msi) of the organopolysiloxane segment to the mass (Msiox) of the organopolysiloxane compound produced by the production method of the invention (hereinafter also referred to as "mass ratio (r) of the organopolysiloxane segment") is preferably 0.1 to 0.95, more preferably 0.3 to 0.9, and still more preferably 0.5 to 0.8. The mass ratio (r) of the organopolysiloxane segment is defined by the following formula:

r=Msi/Msiox=Msi/(Msi+Mox)

wherein Msi and Msiox are as defined above and Mox is the mass of the poly(N-acylalkyleneimine) segment.

The mass ratio (r) of the organopolysiloxane segment is determined from ratio of the integral of the alkyl group or phenyl group in the organopolysiloxane segment to the integral of the methylene group in the poly(N-acylalkyleneimine) segment, each integral being obtained from a nuclear magnetic resonance ($^1$H-NMR) spectrum of a 5% by mass solution of the organopolysiloxane compound in heavy chloroform.

In view of the solubility in ethanol, the weight average molecular weight (MWt) of the organopolysiloxane compound produced by the production method of the invention is preferably 500 to 500,000, more preferably 30,000 to 150,000, and still more preferably 50,000 to 120,000. MWt is determined by GPC described in the example portion.

The specific examples of the organopolysiloxane compound of the invention are described in JP 2-276824A (Patent Document 1) and JP 2009-24114A.

Production Method of Organopolysiloxane Compound

The organopolysiloxane compound of the invention is produced by the reaction of the modified organopolysiloxane having an amino group at a terminal end and/or a side chain of its molecular chain and the terminal reactive poly(N-acylalkyleneimine).

The method of the invention includes the following steps (a) to (d):

a step (a) of subjecting a cyclic imino ether compound represented by formula (I):

wherein $R^1$ is a hydrogen atom, an alkyl group having 1 to 22 carbon atoms, an aralkyl group, or an aryl group and n is 2 or 3,
to ring opening polymerization in a solvent, thereby preparing a terminal reactive poly(N-acylalkyleneimine) solution;
    a step (b) of mixing a modified organopolysiloxane having an amino group at a terminal end and/or a side chain of its molecular chain and a solvent, thereby preparing a modified organopolysiloxane solution;
    a step (c) of mixing the terminal reactive poly(N-acylalkyleneimine) solution obtained in step (a) and the modified organopolysiloxane solution obtained in step (b), thereby allowing 65 to 95 mol % of total amino groups in the modified organopolysiloxane to react with the terminal reactive poly(N-acylalkyleneimine); and
    a step (d) of removing the solvent at 100 to 200° C. after completing step (c).

Step (a)

In step (a), the cyclic imino ether compound represented by formula (I) is subjected to ring opening polymerization (living polymerization) in a solvent, thereby preparing the terminal reactive poly(N-acylalkyleneimine) solution.

$R^1$ and n in formula (I) and their preferred examples are the same as those defined above with respect to $R^1$ and n of formula (1).

Ring Opening Polymerization of Cyclic Imino Ether Compound

The solvent for use in the ring opening polymerization of the cyclic imino ether compound is preferably an aprotic polar solvent. Examples thereof include (C1 to 3) alkyl acetates, such as ethyl acetate and propyl acetate; (C1 to 3) dialkyl ethers, such as diethyl ether and diisopropyl ether; cyclic ethers, such as dioxane and tetrahydrofuran; ketones, such as acetone and methyl ethyl ketone; halogen solvents, such as chloroform and methylene chloride; nitrile solvents, such as acetonitrile and benzonitrile; N,N-dimethylformamide; N,N-dimethylacetamide; and dimethyl sulfoxide, with the (C1 to 3) alkyl acetates being preferably used.

In view of controlling the molecular weight of the polymer to be obtained, the water concentration in the solution which is obtained by mixing the cyclic imino ether compound and a solvent is preferably 600 mg/kg or less, more preferably 200 mg or less, and still more preferably 100 mg/kg or less. In view of the efficiency of operation, the water concentration is preferably 10 mg/kg or more, more preferably 30 mg/kg or more, still more preferably 50 mg/kg or more, and particularly preferably 70 mg/kg or more.

If the water content in the cyclic imino ether compound solution is large, it is preferable to conduct a dehydrating dry treatment. The dehydrating dry treatment is preferably conducted under reduced pressure or by using a dehydrating agent. In view of reducing the load to the apparatus, the water is preferably removed by a dehydrating agent. Examples of the dehydrating agent include molecular sieve, alumina, calcium chloride, and calcium sulfate, with molecular sieve being preferred in view of the water concentration to be achieved and production costs.

In view of reducing the dehydrating time, the dehydrating temperature is preferably 50° C. or lower, more preferably 40° C. or lower, and still more preferably 35° C. or lower. In view of the efficiency of operation, the dehydrating temperature is preferably 5° C. or higher.

The dehydrating agent may be directly added to the cyclic imino ether compound solution and removed from the solution after stirring. In view of easiness of operation, the dehydrating dry treatment is preferably conducted by passing the cyclic imino ether compound solution through a column packed with the dehydrating agent. In view of reducing the dehydrating time, the concentration of the cyclic imino ether compound in its solution is preferably 10 to 80% by mass, more preferably 20 to 60% by mass, and still more preferably 25 to 55% by mass.

The ring opening polymerization of the cyclic imino ether compound may be carried out in the presence of an initiator. A highly electrophilic compound is used as the initiator. Examples thereof include alkyl esters of strong acid, such as alkyl benzenesulfonates, alkyl p-toluenesulfonates, alkyl trifluoromethanesulfonates, alkyl trofluroacetates, and dialkyl sulfates, with dialkyl sulfates, particularly, dialkyl sulfates having an alkyl group having 1 to 3 carbon atoms being preferably used. The amount of the initiator is generally one mole per 2 to 100 mol of the cyclic imino ether compound.

The polymerization temperature is preferably 40 to 150° C., more preferably 60 to 120° C., still more preferably 70 to 110° C., and further preferably 75 to 100° C. In view of controlling the molecular weight of the polymer to be obtained, the polymerization temperature is preferably regulated within the above ranges after adding the initiator.

The polymerization time varies depending upon the reaction conditions, such as the polymerization temperature, and is generally 1 to 60 h, preferably 2 to 50 h, more preferably 3 to 30 h, and still more preferably 5 to 15 h.

When the cyclic imino ether compound represented by formula (I) is 2-substituted-2-oxazoline, poly(N-acylethyleneimine) wherein n in formula (1) is 2 is obtained. When 2-substituted-dihydro-2-oxazine is used, poly(N-acylpropyleneimin) wherein n in formula (1) is 3 is obtained.

The number average molecular weight of the terminal reactive poly(N-acylalkyleneimine) obtained by the ring opening polymerization is preferably 150 to 50000, more preferably 500 to 10000, still more preferably 800 to 5000, and particularly preferably 1000 to 3000. In view of improving the solubility of the organopolysiloxane compound in ethanol, the number average molecular weight is preferably 150 or more, and in view of easiness of production, preferably 50000 or less.

Step (b)

In step (b), the modified organopolysiloxane having an amino group at a terminal end and/or a side chain of its molecular chain is mixed with a solvent, to prepare the modified organopolysiloxane solution.

The modified organopolysiloxane having an amino group at a terminal end and/or a side chain of its molecular chain is not particularly limited and preferably a modified organopolysiloxane represented by formula (II):

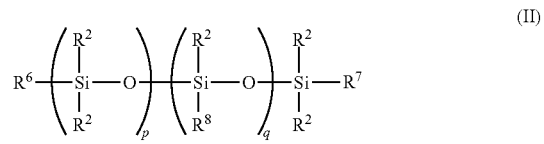

wherein each of $R^2$ is independently an alkyl group having 1 to 22 carbon atoms or a phenyl group; each of $R^6$ and $R^7$ is independently an alkyl group having 1 to 22 carbon atoms, a phenyl group, or a group represented by any of the following formulae (vii) to (xi), $R^8$ is a group represented by any of the following formulae (vii) to (xi), p is an integer of 2 to 4000, and q is an integer of 2 to 150.

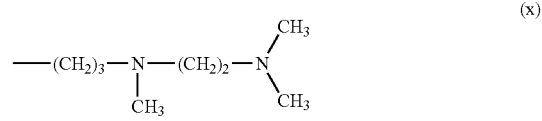

In formula (II), the alkyl group having 1 to 22 carbon atoms or phenyl group represented by $R^2$, $R^6$ and $R^7$ and preferred examples thereof are the same as those defined above with respect to the alkyl group having 1 to 22 carbon atoms or phenyl group for $R^2$ to $R^4$ of formula (2), and p and q and their preferred ranges are the same as those defined above with respect to p and q of formula (2).

Of the groups represented by any of formulae (vii) to (xi), preferred is a group represented by formula (vii) or (viii).

The modified organopolysiloxane is produced by any of known methods and is commercially available, for example, under tradenames KF-8015, KF-864, and KF-8003 of Shin-Etsu Silicone Co., Ltd. and BY16-898 of Toray Dow Corning Co., Ltd.

The solvent for use in step (b) is preferably an aprotic polar solvent. Examples thereof include (C1 to 3) alkyl acetates, such as ethyl acetate and propyl acetate; (C1 to 3) dialkyl ethers, such as diethyl ether and diisopropyl ether; cyclic ethers, such as dioxane and tetrahydrofuran; ketones, such as acetone and methyl ethyl ketone; halogen solvents, such as chloroform and methylene chloride; nitrile solvents, such as acetonitrile and benzonitrile; N,N-dimethylformamide; N,N-dimethylacetamide; and dimethyl sulfoxide, with the (C1 to 3) alkyl acetates being preferably used. In view of the separation of the solution and production costs, the solvent is preferably the same as that used in step (a).

In view of efficiently conducting the dehydrating dry treatment, the concentration of the modified organopolysiloxane in the solution is preferably 10 to 70% by mass, more preferably 20 to 60% by mass, and still more preferably 30 to 50% by mass.

In view of the texture of the organopolysiloxane to be produced by the production method of the invention, the water concentration of the modified organopolysiloxane solution is preferably 100 mg/kg or less, more preferably 90 mg/kg or less, and still more preferably 60 mg/kg or less. In view of the efficiency of operation, the water concentration is preferably 3 mg/kg or more, more preferably 5 mg/kg or more, still more preferably 10 mg/kg or more, and further preferably 30 mg/kg or more.

If the water content in the modified organopolysiloxane solution is large, it is preferable to conduct a dehydrating dry treatment in the same manner as in the dehydration of the cyclic imino ether compound solution in step (a). Specifically, the dehydrating dry treatment is conducted by using a dehydrating agent in view of reducing the load to the apparatus. In view of the water concentration to be achieved and production costs, molecular sieves are preferably used as the dehydrating agent. The dehydrating temperature is preferably 40° C. or lower in view of reducing the dehydrating time, and preferably 5° C. or higher in view of the efficiency of operation. The dehydrating agent may be directly added to the modified organopolysiloxane solution and removed from the solution after stirring. In view of easiness of operation, the dehydrating dry treatment is preferably conducted by passing the modified organopolysiloxane solution through a column packed with the dehydrating agent.

In a preferred embodiment, in view of controlling the molecular weight of the polymer to be obtained, the terminal reactive poly(N-acylalkyleneimine) solution is preferably cooled before the next step (c) preferably to 70° C. or lower, more preferably to 10 to 65° C., still more preferably to 20° C. to 60° C., and particularly preferably to 25 to 40° C.

Step (c)

In step (c), the terminal reactive poly(N-acylalkyleneimine) solution obtained in step (a) and the modified organopolysiloxane solution obtained in step (b) are mixed together to allow 65 to 95 mol % of the total amino groups in the modified organopolysiloxane to react with the terminal reactive poly(N-acylalkyleneimine).

By allowing 65 to 95 mol % of the total amino groups in the modified organopolysiloxane to react with the terminal reactive poly(N-acylalkyleneimine), thereby controlling the connecting ratio of the organopolysiloxane segment within 65 to 95%, the organopolysiloxane compound excellent in the heat stability is obtained. Namely, the organopolysiloxane compound having good texture with little sticky nature is stably produced without reducing the molecular weight even if the treatment for removing the solvent, etc. are carried out at high temperatures.

Connecting Reaction

In view of the heat stability of the organopolysiloxane compound and the prevention of by-product formation, the connecting ratio of the organopolysiloxane segment is 65 to 95%, preferably 70 to 90%, and more preferably 72 to 88%.

One mole of initiator generates one mole of the active point of the terminal reactive poly(N-acylalkyleneimine) which is to be connected with the amino group in the modified organopolysiloxane. For example, the organopolysiloxane compound having a connecting ratio of 65 to 95% is obtained by adding the initiator in an amount of 65 to 95 mol % of the amino groups in the modified organopolysiloxane. The initiator to be used may be the same as that used in step (a).

The reaction temperature of the terminal reactive poly(N-acylalkyleneimine) solution and the modified organopolysiloxane solution is preferably 40 to 150° C., more preferably 60 to 120° C., still more preferably 70 to 110° C., and further preferably 75 to 100° C. In view of controlling the molecular weight of the reaction product to be obtained, the reaction temperature is preferably regulated within the above ranges after mixing the terminal reactive poly(N-acylalkyleneimine) solution and the modified organopolysiloxane solution.

The reaction time varies depending upon the reaction conditions, such as the polymerization temperature, and is generally 1 to 60 h, preferably 3 to 30 h, and more preferably 5 to 15 h.

The water concentration of the mixed reaction solution which is obtained after mixing the terminal reactive poly(N-acylalkyleneimine) solution and the modified organopolysiloxane solution and allowing them to react can be controlled to 150 mg/kg or less, preferably 120 mg/kg or less, more preferably 100 mg/kg or less, and still more preferably 80 mg/kg or less by controlling the water concentrations of the terminal reactive poly(N-acylalkyleneimine) solution and the modified organopolysiloxane solution. The lower limit of the water concentration may be 0 mg/kg or more, but preferably 5 mg/kg or more, more preferably 10 mg/kg or more, and particularly preferably 30 mg/kg or more in view of efficiently conducting the operations of steps (a) and (b).

Step (d)

In step (d), the solvent is removed after step (c) at 100 to 200° C.

Since the solvent odor of personal care products is not favored, it is advisable to remove the residual solvent in the organopolysiloxane compound as much as possible if it is intended to apply the organopolysiloxane compound to personal care productions. The removal of the solution from the reaction solution is conducted preferably at 120 to 170° C., and more preferably at 140 to 160° C. To remove the solvent efficiently, it is preferable to conduct the removal under reduced pressure.

In view of removing the residual solvent odor, the concentration of residual solvent is preferably 3000 mg/kg or less, more preferably 2000 mg/kg or less, and particularly preferably 1000 mg/kg or less.

In a preferred embodiment, in view of production efficiency, the solvent may be removed by using a twin-screw solvent removing machine described in JP 10-279690A. This solvent removing machine utilizes the space from the bottom of tank to the uppermost end of the twin-screw as the effective volume. On the upper portion of the effective volume, an evaporation chamber which is a space uniformly extending from the inlet of the raw material to the outlet of the dried product is disposed. On the ceiling of the evaporation chamber, a vent connecting to a vacuum line is disposed.

In view of preventing the discoloration of the modified organopolysiloxane to be obtained, the removal of the solvent is preferably conducted in nitrogen atmosphere.

EXAMPLES

Measurement of Molecular Weight

In the following examples and comparative examples, the number average molecular weight and the weight average molecular weight of poly(N-propionylethyleneimine) and the weight average molecular weight of final product were determined by gel permeation chromatography (GPC) under the following conditions.
Measuring conditions
Column: two K-804L (tradename, manufactured by Showa Denko K.K.) connected in series.
Eluting solution: 1 mmol/L Farmin DM20 (tradename, manufactured by Kao Corp oration)/chloroform
Flow rate: 1.0 mL/min
Column temperature: 40° C.
Detector: differential refractometer
Sample: 5 mg/mL, 100 μL
Polystyrene calibration The molecular weight of the organopolysiloxane segment is nearly the same as the weight average molecular weight of a primary aminopropyl side chain-modified organopolysiloxane. After acetylating the primary aminopropyl side chain-modified organopolysiloxane in the manner described below, the weight average molecular weight of the primary aminopropyl side chain-modified organopolysiloxane was determined by GPC under the same conditions as in the measurement of the weight average molecular weight of the poly(N-propionylethyleneimine).
Acetylation of Primary Aminopropyl Side Chain-Modified Organopolysiloxane Into a round flask equipped with a condenser, 90 g of chloroform and 10 g of primary aminopropyl side chain-modified polydimethylsiloxane were added and dissolved uniformly. Then, acetic anhydride was added in an amount equivalent to the amino groups of the primary aminopropyl side chain-modified polydimethylsiloxane and the acetylation of the amino groups was allowed to proceed for 8 h under reflux while stirring. After leaving the solution to stand for cooling, the solvent was removed under reduced pressure, to prepare a sample for measuring the molecular weight.
Measurement of Water Concentration The water concentration of the solution was measured by using the following apparatus.
Apparatus: Karl Fischer Moisture Meter (tradename: CA-06, manufactured by Mitsubishi Chemical Corporation)
Catholyte: Aquamicron CK (tradename, manufactured by Mitsubishi Chemical Corporation)
Anolyte: Aquamicron AU (tradename, manufactured by Mitsubishi Chemical
Corporation): Aquamicron CM (tradename, manufactured by Mitsubishi Chemical Corporation)=20:80 (by volume %)
Measurement of Residual Solvent Measured by gas chromatography under the following conditions.
Column: PTA-5 (tradename) 30 m×0.25 mm×0.5 μm manufactured by Supelco.
Detector: FID
Temperature elevation: 40° C., 5 min→8° C./min 200° C., 0 min, splitless
Injection temperature: 200° C.
Injection amount: 1 μl
Detection temperature: 200° C.
Preparation of sample: about 0.5 g of internal standard, dimethylacetamide (manufactured by Wako Pure Chemical Industries, Ltd.) and about 0.5 g of sample, each accurately weighed, were diluted to about 10 ml with ethanol.
Measurement of Amount of Non-Reacted Amines About 3 g of a sample accurately weighed was dissolved in 50 mL of a methanol/chloroform=50/50 (volume/volume) solvent. The solution was titrated with a 0.1 mol/L perchloric acid/acetic acid standard solution using a potentiometric titration apparatus. A blank test was carried out separately. The amine value was calculated from the following equation using the measured values:

$$\text{Amine value (mol/g)}=(A-B)\times f/(\text{amount of sample (g)}\times 10000)$$

wherein A is the amount (mL) of the 0.1 mol/L perchloric acid/acetic acid standard solution required for the titration of the sample;

B is the amount (mL) of the 0.1 mol/L perchloric acid/acetic acid standard solution required for the titration of the blank test; and f is a factor of the 0.1 mol/L perchloric acid/acetic acid standard solution.

Example 1

A solution of 60.8 g (0.61 mol) of 2-ethyl-2-oxazoline and 143.3 g of ethyl acetate was dehydrated for 15 h by using 10.0 g of molecular sieve (tradename: Zeorum A-4, manufactured by Tosoh Corporation), to reduce the water concentration to 88 mg/kg or less.

A solution of 150.0 g (amino group content: 0.075 mol) of a primary aminopropyl side chain-modified polydimethylsiloxane (tradename: KF-8003, manufactured by Shin-Etsu Silicone Co., Ltd., weight average molecular weight: 50000, amine equivalent: 2000) and 304.2 g of ethyl acetate was dehydrated for 15 h by using 23 g of the molecular sieve, to reduce the water concentration to 54 mg/kg or less.

After adding 9.8 g (0.064 mol) of diethyl sulfate to the dehydrated solution of 2-ethyl-2-oxazoline in ethyl acetate, the mixture was refluxed in nitrogen atmosphere for 8 h at 80° C. under heating, thereby synthesizing a terminal reactive poly(N-propionylethyleneimine). The number average molecular weight was 1100 and the weight average molecular weight was 1300 when measured by GPC.

The terminal reactive poly(N-propionylethyleneimine) solution was cooled to 30° C. and added with the dehydrated primary aminopropyl side chain-modified polydimethylsiloxane solution in one portion. The mixture was refluxed for 10 h at 80° C. under heating and then cooled, to obtain 658 g of a solution of N-propionylethyleneimine-dimethylsiloxane copolymer in ethyl acetate. A part of the solution was concentrated at room temperature under reduced pressure, to obtain a N-propionylethyleneimine-dimethylsiloxane copolymer as a pale yellow solid. The mass ratio of the organopolysiloxane segment was 0.69 and the weight average molecular weight was 116000. The result of the neutralizing titration of the obtained organopolysiloxane compound showed that 15 mol % of the amino groups in the starting primary aminopropyl side chain-modified polydimethylsiloxane remained unreacted (connecting ratio: 85%).

In a flat stainless vat, 50 g of the obtained solution of N-propionylethyleneimine-dimethylsiloxane copolymer in ethyl acetate was placed, and the solvent was removed at 150°

C. under reduced pressure (10 kPa) by drying under heating for one hour. The weight average molecular weight of the obtained solid was 119000. The residual solvent was 610 mg/kg (on the basis of solid).

Example 2

A solution of 41.0 g (0.41 mol) of 2-ethyl-2-oxazoline and 95.54 g of ethyl acetate was dehydrated for 15 h by using 7.5 g of molecular sieve (tradename: Zeorum A-4, manufactured by Tosoh Corporation), to reduce the water concentration to 93 mg/kg or less.

A solution of 100.0 g (amino group content: 0.050 mol) of a primary aminopropyl side chain-modified polydimethylsiloxane (tradename: KF-8003, manufactured by Shin-Etsu Silicone Co., Ltd., weight average molecular weight: 50000, amine equivalent: 2000) and 203.0 g of ethyl acetate was dehydrated for 15 h by using 15 g of the molecular sieve, to reduce the water concentration to 82 mg/kg or less.

After adding 6.0 g (0.039 mol) of diethyl sulfate to the dehydrated solution of 2-ethyl-2-oxazoline in ethyl acetate, the mixture was refluxed in nitrogen atmosphere for 8 h at 80° C. under heating, thereby synthesizing a terminal reactive poly(N-propionylethyleneimine). The number average molecular weight was 1300 and the weight average molecular weight was 1500 when measured by GPC.

The terminal reactive poly(N-propionylethyleneimine) solution was cooled to 30° C. and added with the dehydrated primary aminopropyl side chain-modified polydimethylsiloxane solution in one portion. The mixture was refluxed for 10 h at 80° C. under heating and then cooled, to obtain 440 g of a solution of N-propionylethyleneimine-dimethylsiloxane copolymer in ethyl acetate. A part of the solution was concentrated at room temperature under reduced pressure, to obtain a N-propionylethyleneimine-dimethylsiloxane copolymer as a pale yellow solid. The mass ratio of the organopolysiloxane segment was 0.68 and the weight average molecular weight was 65000. The result of the neutralizing titration of the obtained organopolysiloxane compound showed that 26 mol % of the amino groups in the starting primary aminopropyl side chain-modified polydimethylsiloxane remained unreacted (connecting ratio: 74%).

In a flat stainless vat, 50 g of the obtained solution of N-propionylethyleneimine-dimethylsiloxane copolymer in ethyl acetate was placed, and the solvent was removed at 150° C. under reduced pressure (10 kPa) by drying under heating for one hour. The weight average molecular weight of the obtained solid was 64000. The residual solvent was 550 mg/kg (on the basis of solid).

Comparative Example 1

A solution of 59.0 g (0.60 mol) of 2-ethyl-2-oxazoline and 143.3 g of ethyl acetate was dehydrated for 15 h by using 21.0 g of molecular sieve (tradename: Zeorum A-4, manufactured by Tosoh Corporation), to reduce the water concentration to 92 mg/kg or less.

A solution of 150.0 g (amino group content: 0.075 mol) of a primary aminopropyl side chain-modified polydimethylsiloxane (tradename: KF-8003, manufactured by Shin-Etsu Silicone Co., Ltd., weight average molecular weight: 50000, amine equivalent: 2000) and 304.5 g of ethyl acetate was dehydrated for 15 h by using 23 g of the molecular sieve, to reduce the water concentration to 56 mg/kg or less.

After adding 11.56 g (0.075 mol) of diethyl sulfate to the dehydrated solution of 2-ethyl-2-oxazoline in ethyl acetate, the mixture was refluxed in nitrogen atmosphere for 8 h at 80° C. under heating, thereby synthesizing a terminal reactive poly(N-propionylethyleneimine). The number average molecular weight was 900 and the weight average molecular weight was 1100 when measured by GPC.

The terminal reactive poly(N-propionylethyleneimine) solution was cooled to 30° C. and added with the dehydrated primary aminopropyl side chain-modified polydimethylsiloxane solution in one portion. The mixture was refluxed for 10 h at 80° C. under heating and then cooled, to obtain 660 g of a solution of N-propionylethyleneimine-dimethylsiloxane copolymer in ethyl acetate. A part of the solution was concentrated at room temperature under reduced pressure, to obtain a N-propionylethyleneimine-dimethylsiloxane copolymer as a pale yellow solid. The mass ratio of the organopolysiloxane segment was 0.67 and the weight average molecular weight was 85000. The result of the neutralizing titration of the obtained organopolysiloxane compound showed that no amino group remained (connecting ratio: 100%).

In a flat stainless vat, 50 g of the obtained solution of N-propionylethyleneimine-dimethylsiloxane copolymer in ethyl acetate was placed, and the solvent was removed at 150° C. under reduced pressure (10 kPa) by drying under heating for one hour. The weight average molecular weight of the obtained solid was 66000. The residual solvent was 500 mg/kg (on the basis of solid).

Comparative Example 2

A solution of 56.5 g (0.57 mol) of 2-ethyl-2-oxazoline and 124.4 g of ethyl acetate was dehydrated for 15 h by using 9.0 g of molecular sieve (tradename: Zeorum A-4, manufactured by Tosoh Corporation), to reduce the water concentration to 85 mg/kg or less.

A solution of 150.0 g (amino group content: 0.075 mol) of a primary aminopropyl side chain-modified polydimethylsiloxane (tradename: KF-8003, manufactured by Shin-Etsu Silicone Co., Ltd., weight average molecular weight: 50000, amine equivalent: 2000) and 304.5 g of ethyl acetate was dehydrated for 15 h by using 23 g of the molecular sieve, to reduce the water concentration to 46 mg/kg or less.

After adding 4.72 g (0.031 mol) of diethyl sulfate to the dehydrated solution of 2-ethyl-2-oxazoline in ethyl acetate, the mixture was refluxed in nitrogen atmosphere for 8 h at 80° C. under heating, thereby synthesizing a terminal reactive poly(N-propionylethyleneimine). The number average molecular weight was 2000 and the weight average molecular weight was 2400 when measured by GPC.

The terminal reactive poly(N-propionylethyleneimine) solution was cooled to 30° C. and added with the dehydrated primary aminopropyl side chain-modified polydimethylsiloxane solution in one portion. The mixture was refluxed for 10 h at 80° C. under heating and then cooled, to obtain 637 g of a solution of N-propionylethyleneimine-dimethylsiloxane copolymer in ethyl acetate. A part of the solution was concentrated at room temperature under reduced pressure, to obtain a N-propionylethyleneimine-dimethylsiloxane copolymer as a pale yellow solid. The obtained solid was insoluble in various solvents, such as ethyl acetate and chloroform. The set value of the connecting ratio was 40%.

In a flat stainless vat, 50 g of the obtained solution of N-propionylethyleneimine-dimethylsiloxane copolymer in ethyl acetate was placed, and the solvent was removed at 150° C. under reduced pressure (10 kPa) by drying under heating for one hour. The obtained solid was insoluble in various solvents, such as ethanol, ethyl acetate, and chloroform.

TABLE 1

|  | Examples | | Comparative Examples | |
|---|---|---|---|---|
|  | 1 | 2 | 1 | 2 |
| Residual amino group (mol %) (connecting ratio) | 15 (85%) | 26 (74%) | 0 (100%) | 60 (40%)*[1] |
| Molecular weight before heating | 116000 | 65000 | 85000 | unmeasurable |
| Molecular weight after heating | 119000 | 64000 | 66000 | unmeasurable |

*[1]set value

As seen from the results of Table 1, the molecular weight of the organopolysiloxane compound having a connecting ratio of 100% of Comparative Example 1 was reduced by the heating treatment for removing the solvent. The reduction in the molecular weight results in poor texture with sticky touch. In contrast, in the organopolysiloxane compounds of Examples 1 and 2 in which the connecting ratio was controlled to 85% or 74%, the molecular weight was not reduced even after the heat treatment. This shows that organopolysiloxane compounds having good texture with little sticky nature were stably produced in Examples 1 and 2.

Figure 2:
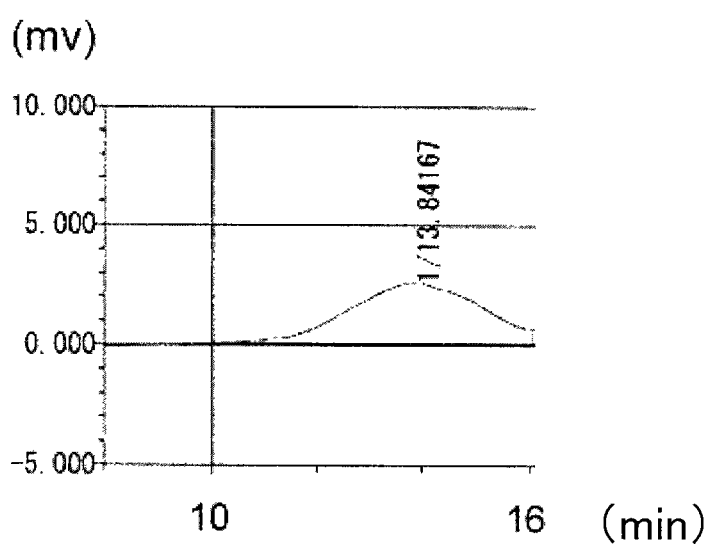
FIG. 2 is a GPC chart of the sample in Example 1 after heat-drying.
Figure 3:
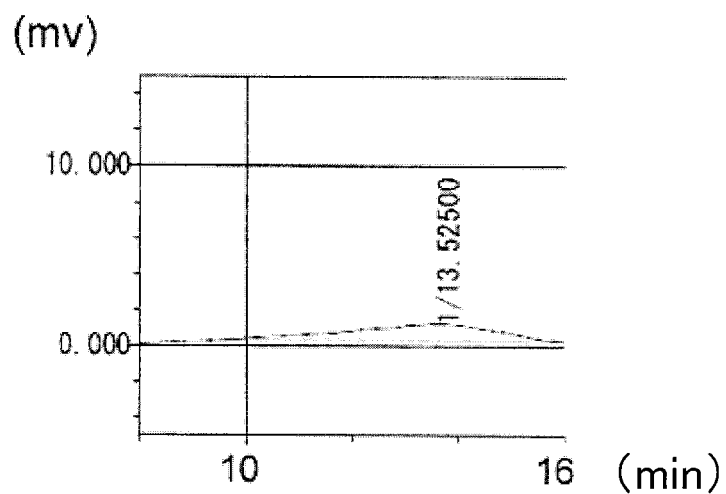
FIG. 3 is a GPC chart of the sample in Comparative Example 1 before heat-drying.
Figure 4:
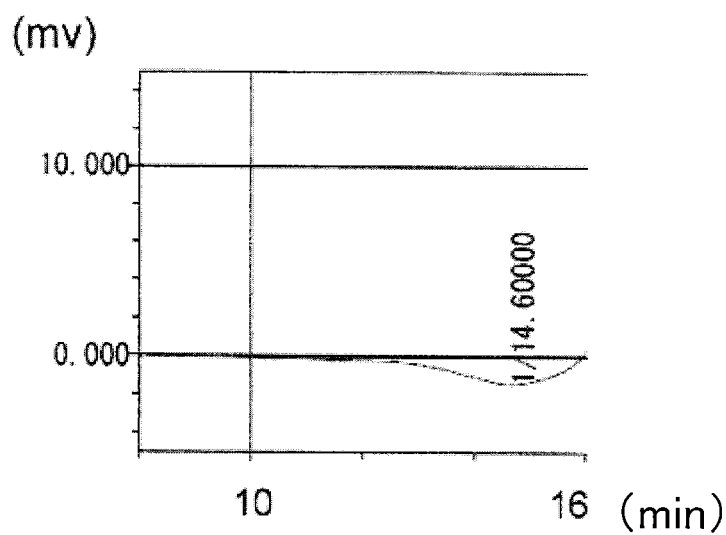
FIG. 4 is a GPC chart of the sample in Comparative Example 1 after heat-drying.

The sample of each of Example 1 and Comparative Example 1 was analyzed for GPC before and after heat-drying. The results are shown in FIGS. 1 to 4. FIG. 1 is a GPC chart of the sample in Example 1 before heat-drying and FIG. 2 is a GPC chart of the sample in Example 1 after heat-drying. FIG. 3 is a GPC chart of the sample in Comparative Example 1 before heat-drying and FIG. 4 is a GPC chart of the sample in Comparative Example 1 after heat-drying.

FIGS. 1 to 4 show that the molecular weight varied largely by the heat treatment in Comparative Example 1 and in contrast in Example 1 the molecular weight was not reduced even by the heat treatment.

In view of avoiding disadvantageous reaction, it has been generally acknowledged that the content of amino groups in an organopolysiloxane compound, such as those produced in the present invention, is preferably reduced as low as possible, i.e., the connecting ratio is preferably increased as high as possible. In face of the fact acknowledged in the art, however, the organopolysiloxane compound having good texture with little sticky nature can be stably produced in the present invention, because the molecular weight is not reduced contrary to the expectations after the heat treatment even if the connection ratio is reduced.

INDUSTRIAL APPLICABILITY

The organopolysiloxane compound produced by the method of the invention has good texture with little sticky nature and suitably used as a base material for cosmetics.

What is claimed is:

1. A method of producing an organopolysiloxane compound, the method comprising:
    (a) subjecting a cyclic imino ether compound represented by formula (I):

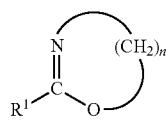

(I)

wherein $R^1$ is a hydrogen atom, an alkyl group having 1 to 22 carbon atoms, an aralkyl group or an aryl group, and n is 2 or 3, to ring opening polymerization in a solvent, thereby preparing a terminal reactive poly(N-acylalkyleneimine) solution;

(b) mixing a modified organopolysiloxane having an amino group at a terminal end, a side chain of its molecular chain, or both, and a solvent, thereby preparing a modified organopolysiloxane solution;

(c) mixing the terminal reactive poly(N-acylalkyleneimine) solution obtained in said (a) subjecting and the modified organopolysiloxane solution obtained in said (b) mixing, thereby allowing 65 to 95 mol % of total amino groups in the modified organopolysiloxane to react with the terminal reactive poly(N-acylalkyleneimine); and (d) removing the solvent at 100 to 200° C. after completing said (c) mixing, to obtain the organopolysiloxane compound, wherein a poly(N-acylalkyleneimine) segment comprising repeating units represented by formula (I):

(1)

wherein $R^1$ and n are the same as defined above with respect to $R^1$ and n of formula (I), is bonded to a terminal end of an organopolysiloxane segment, a side chain of the organopolysiloxane segment, or both, and further comprising cooling the terminal reactive poly(N-acylalkyleneimine) solution obtained in said (a) to a temperature of 60 to 10° C. before said (c).

2. The method according to claim 1, wherein the modified organopolysiloxane is represented by formula (II):

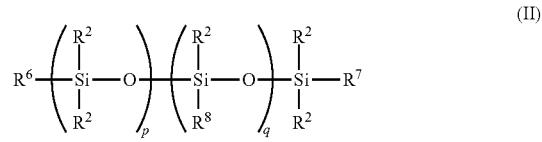

(II)

wherein each of $R^2$ is independently an alkyl group having 1 to 22 carbon atoms or a phenyl group;

each of $R^6$ and $R^7$ is independently an alkyl group having 1 to 22 carbon atoms, a phenyl group, or a group represented by any of formulae (vii) to (xi):

(vii)

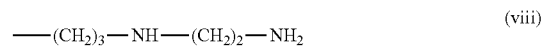

(viii)

(ix)

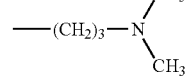

-continued

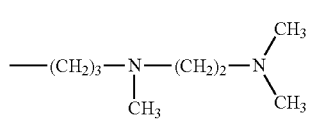

(x)

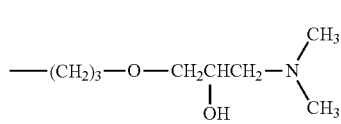

(xi)

$R^8$ is a group represented by any of the above formulae (vii) to (xi);
p is an integer of 2 to 4000; and
q is an integer of 2 to 150.

3. The method according to claim 1, wherein 70 to 90 mol % of total amino groups in the modified organopolysiloxane is allowed to react with the terminal reactive poly(N-acylalkyleneimine) in said (c) mixing.

4. The method according to claim 1, wherein the solvent is removed under reduced pressure in said (d) removing.

5. The method according to claim 1, wherein a weight average molecular weight of the organopolysiloxane compound is 500 to 500,000.

6. The method according to claim 1, wherein the solvent present in said (a) subjecting is an aprotic polar solvent.

7. The method according to claim 1, wherein a weight average molecular weight of the modified organopolysiloxane having an amino group present in said (b) mixing is 300 to 300,000.

8. The method according to claim 1, wherein the solvent present in said (b) mixing is an aprotic polar solvent.

9. The method according to claim 1, wherein the reaction in said (c) mixing is conducted at 40 to 150° C.

10. The method according to claim 1, wherein the solvent is removed at 120 to 170° C. in said (d) removing.

11. The method according to claim 1, wherein the solvent is removed in said (d) removing with a twin-screw solvent removing machine wherein:
   a space from the bottom of tank to an uppermost end of the twin-screw is utilized as an effective volume;
   an evaporation chamber which is a space uniformly extending from an inlet of a raw material to an outlet of a dried product is disposed on an upper portion of the effective volume; and
   a vent connecting to a vacuum line is disposed on a ceiling of the evaporation chamber.

12. The method according to claim 1, wherein the solvent is removed in nitrogen atmosphere in said (d) removing.

13. The method according to claim 1, wherein the solvent is removed such that a concentration of residual solvent is reduced to 3000 mg/kg or less.

14. A method of preventing reduction in a molecular weight of an organopolysiloxane compound, the method comprising:
   (a) subjecting a cyclic imino ether compound represented by formula (I):

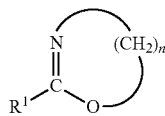

(I)

wherein $R^1$ is a hydrogen atom, an alkyl group having 1 to 22 carbon atoms, an aralkyl group, or an aryl group, and n is 2 or 3,
to ring opening polymerization in a solvent, thereby preparing a terminal reactive poly(N-acylalkyleneimine) solution;
   (b) mixing a modified organopolysiloxane having an amino group at a terminal end, a side chain of its molecular chain, or both, and a solvent, thereby preparing a modified organopolysiloxane solution;
   (c) mixing the terminal reactive poly(N-acylalkyleneimine) solution obtained in said (a) subjecting and the modified organopolysiloxane solution obtained in (b) mixing, thereby allowing amino groups in the modified organopolysiloxane to react with the terminal reactive poly(N-acylalkyleneimine); and
   (d) removing the solvent at 100 to 200° C. after completing said (c) mixing, to obtain the organopolysiloxane compound in which a poly(N-acylalkyleneimine) segment comprising repeating units represented by formula (1):

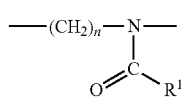

(1)

wherein $R^1$ and n are the same as defined above with respect to $R^1$ and n of formula (I),
is bonded to a terminal end of an organopolysiloxane segment, a side chain of the organopolysiloxane segment, or both,
wherein 65 to 95 mol % of total amino groups in the modified organopolysiloxane is allowed to react with the terminal reactive poly(N-acylalkyleneimine) in said (c) mixing, thereby preventing the molecular weight of the organopolysiloxane compound from being reduced in said (d) removing, and
further comprising cooling the terminal reactive poly(N-acylalkyleneimine) solution obtained in said (a) to a temperature of 60 to 10° C. before said (c).

15. The method according to claim 1, wherein the cooling temperature is form 60 to 20° C.

16. The method according to claim 1, wherein the cooling temperature is form 60 to 30° C.

17. The method according to claim 14, wherein the cooling temperature is form 60 to 20° C.

18. The method according to claim 14, wherein the cooling temperature is form 60 to 30° C.

* * * * *